United States Patent
Ishii

(10) Patent No.: US 9,160,930 B2
(45) Date of Patent: Oct. 13, 2015

(54) LENS DRIVING CONTROL APPARATUS AND LENS APPARATUS

(75) Inventor: Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/004,940

(22) PCT Filed: Mar. 19, 2012

(86) PCT No.: PCT/JP2012/001895
§ 371 (c)(1),
(2), (4) Date: Sep. 13, 2013

(87) PCT Pub. No.: WO2012/132306
PCT Pub. Date: Oct. 4, 2012

(65) Prior Publication Data
US 2014/0002706 A1    Jan. 2, 2014

(30) Foreign Application Priority Data

Mar. 29, 2011   (JP) .................................. 2011-071318

(51) Int. Cl.
| | |
|---|---|
| *H04N 5/232* | (2006.01) |
| *G02B 7/08* | (2006.01) |
| *G02B 7/34* | (2006.01) |
| *H04N 5/369* | (2011.01) |
| *G03B 13/36* | (2006.01) |

(52) U.S. Cl.
CPC .............. *H04N 5/23296* (2013.01); *G02B 7/08* (2013.01); *G02B 7/34* (2013.01); *H04N 5/23212* (2013.01); *H04N 5/3696* (2013.01); *G03B 13/36* (2013.01)

(58) Field of Classification Search
None
See application file for complete search history.

(56) References Cited

U.S. PATENT DOCUMENTS

| | | | |
|---|---|---|---|
| 2008/0084483 | A1 | 4/2008 | Kusaka |
| 2010/0289940 | A1 | 11/2010 | Toguchi |

FOREIGN PATENT DOCUMENTS

| | | | | |
|---|---|---|---|---|
| JP | 05-196861 A | | 8/1993 | |
| JP | 05196861 A | * | 8/1993 | ............... G02B 7/28 |
| JP | 06-098238 A | | 4/1994 | |
| JP | 06-178187 A | | 6/1994 | |

(Continued)

OTHER PUBLICATIONS

May 15, 2012 International Search Report and Written Opinion in International Patent Appln. No. PCT/JP2012/001895.

*Primary Examiner* — Twyler Haskins
*Assistant Examiner* — Angel L Garces-Rivera
(74) *Attorney, Agent, or Firm* — Fitzpatrick, Cella, Harper & Scinto

(57) ABSTRACT

A lens driving control apparatus includes an image pickup element that includes an imaging pixel and a focus detection pixel and that performs a photoelectric conversion of an object image, a readout unit that reads image signals from the focus detection pixel with a predetermined period, a storage unit that stores the image signals read by the readout unit, an addition unit that adds a plurality of signals in time-series continuous frames of the image signals, a focus detection unit that performs focus detection based on an addition result by the addition unit, and a lens controller that controls a driving speed of a lens based on the addition number of times by the addition unit and a result of the focus detection unit, and the lens controller performs a control so that the driving speed of the lens is reduced when the addition number of times increases.

6 Claims, 13 Drawing Sheets

(56) References Cited

FOREIGN PATENT DOCUMENTS

| JP | 08-317273 | A |   | 11/1996 | |
| JP | 08317273 | A | * | 11/1996 | ............. H04N 5/232 |
| JP | 2000-292686 | A |   | 10/2000 | |
| JP | 2007-306129 | A |   | 11/2007 | |
| JP | 2008-085738 | A |   | 4/2008 | |
| JP | 2010-266742 | A |   | 11/2010 | |
| JP | 2010266742 | A | * | 11/2010 | |

* cited by examiner

PLAN VIEW

A-A CROSS-SECTIONAL VIEW

PLAN VIEW

A-A CROSS-SECTIONAL VIEW

PLAN VIEW

A-A CROSS-SECTIONAL VIEW

Fig. 6

LENS DRIVING CONTROL APPARATUS AND LENS APPARATUS

TECHNICAL FIELD

The present invention relates to a lens driving control apparatus such as a digital camera or a video camera.

BACKGROUND ART

Patent Literature 1 discloses a configuration in which a pupil division function is provided by displacing a sensitivity region of a light receiving portion with respect to an optical axis of an on-chip microlens for a part of light receiving elements (pixels) of an image pickup element. These pixels are disposed at a predetermined interval between imaging pixel groups as focus detection pixels, and are configured to perform phase difference focus detection.

Patent Literature 2 discloses an image pickup apparatus that performs focus detection calculation by adding image data of focus detection pixel stored by a plurality of past reading in order to satisfy both a refresh operation with a short period and focus detection for an object with a low luminance.

CITATION LIST

Patent Literature

PTL 1: Japanese Patent Laid-Open No. 2000-292686
PTL 2: Japanese Patent Laid-Open No. 2008-085738

SUMMARY OF INVENTION

Technical Problem

However, in the image pickup apparatus disclosed in Patent Literature 2, the image data of the focus detection pixel in each frame is stored and the focus detection calculation is performed based on image data that are obtained by adding the image data of the focus detection pixel stored by the plurality of past readings. Therefore, during the drive of the lens, the image data stored in the past frame that is to be added incorporates object information taken at a position different from a lens position in the current frame. Accordingly, when the addition number of the image data of the focus detection pixel in the past frame increases, an error factor generated by performing the focus detection calculation also increases. When the lens is driven based on defocus information obtained as described above, an appropriate driving of the lens is difficult.

The present invention provides a lens driving control apparatus and a lens apparatus that suppress a focus detection error by appropriately controlling a lens driving speed while adding image signals of focus detection pixel in time-series continuous frames to perform focus detection.

Solution to Problem

A lens driving control apparatus as one aspect of the present invention includes an image pickup element that includes an imaging pixel and a focus detection pixel, configured to perform a photoelectric conversion of an object image, a readout unit configured to read image signals from the focus detection pixel with a predetermined period, a storage unit configured to store the image signals read by the readout unit, an addition unit configured to add a plurality of signals in time-series continuous frames of the image signals, a focus detection unit configured to perform focus detection based on an addition result by the addition unit, and a lens controller configured to control a driving speed of a lens based on the addition number of times by the addition unit and a result of the focus detection unit, and the lens controller performs a control so that the driving speed of the lens is reduced when the addition number of times increases.

A lens apparatus as another aspect of the present invention includes an imaging optical system including a lens, configured to form an object image, an input unit configured to input the addition number of times by an addition unit and a result of a focus detection unit from an image pickup apparatus body including an image pickup element that includes an imaging pixel and a focus detection pixel, configured to perform a photoelectric conversion of an object image, a readout unit configured to read image signals from the focus detection pixel with a predetermined period, a storage unit configured to store the image signals read by the readout unit, the addition unit configured to add a plurality of signals in time-series continuous frames of the image signals, and the focus detection unit configured to perform focus detection based on an addition result by the addition unit, and a lens controller configured to control a driving speed of the lens based on the addition number of times and the result of the focus detection unit inputted from the input unit, and the lens controller performs a control so that the driving speed of the lens is reduced when the addition number of times increases.

Further features and aspects of the present invention will become apparent from the following description of exemplary embodiments with reference to the attached drawings.

Advantageous Effects of Invention

According to the present invention, a lens driving control apparatus and a lens apparatus that suppress a focus detection error can be provided by appropriately controlling a lens driving speed while adding image signals of focus detection pixel in time-series continuous frames to perform focus detection.

BRIEF DESCRIPTION OF DRAWINGS

FIG. 6 is a diagram of illustrating an arrangement region of the focus detection pixel in the present embodiment.

DESCRIPTION OF EMBODIMENTS

Figure 1:
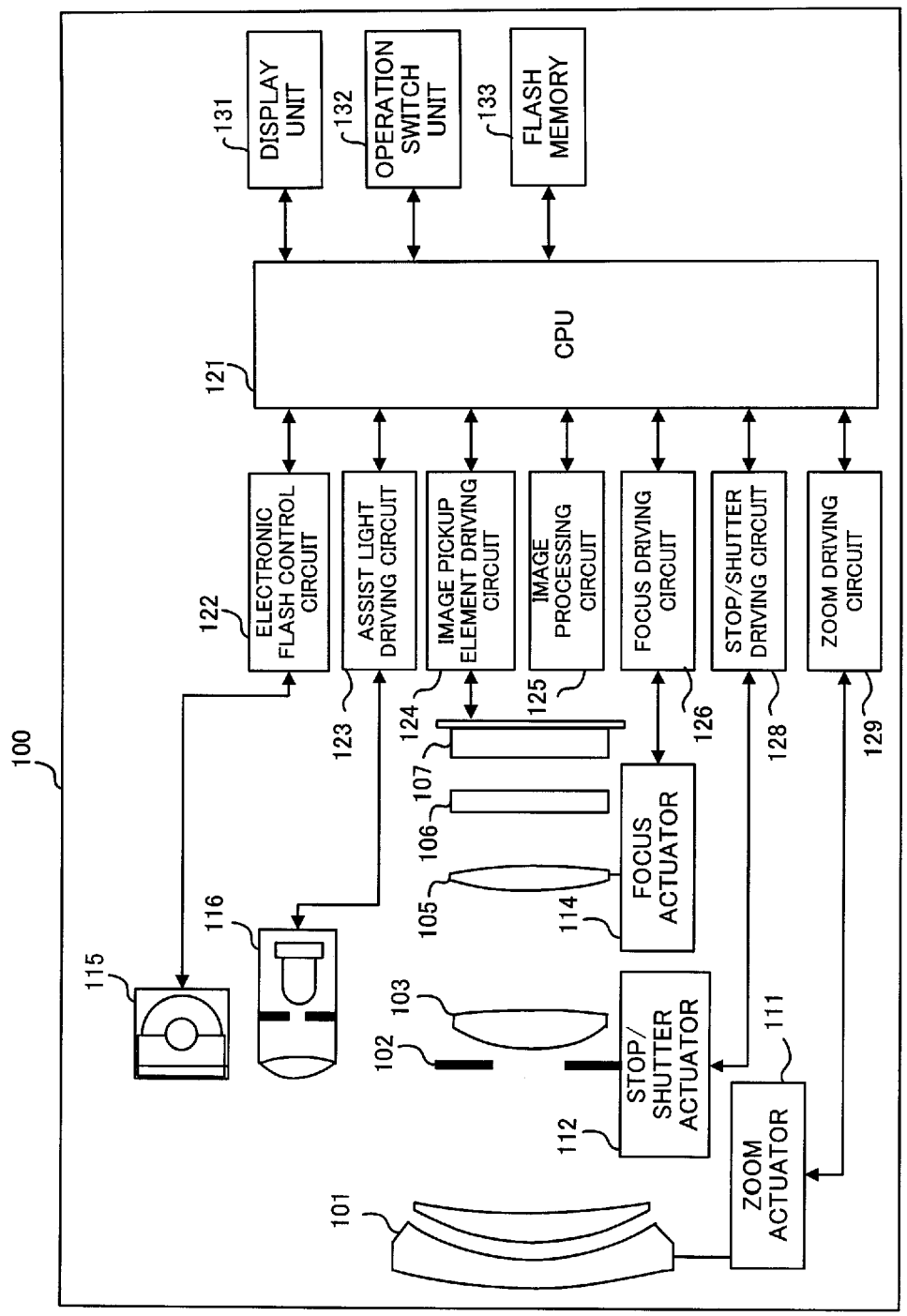
FIG. 1 is a configuration diagram of a camera in the present embodiment.

Exemplary embodiments of the present invention will be described below with reference to the accompanied drawings. In each of the drawings, the same elements will be denoted by the same reference numerals and the duplicate descriptions thereof will be omitted.

FIG. 1 is a configuration diagram of a camera in the present embodiment, which illustrates a camera 100 (a lens driving control apparatus) that is integrally configured by a camera body (an image pickup apparatus body) having an image pickup element and an image pickup lens (a lens apparatus). In FIG. 1, reference numeral 101 denotes a first lens unit that is disposed at an end of an image pickup optical system (an imaging optical system) that forms an object image, which is held so as to be movable in an optical axis direction. Reference numeral 102 denotes a shutter with a stop, which adjusts its aperture diameter to perform a light intensity adjustment at the time of taking an image and also has a function as a shutter used for adjusting an exposure time at the time of taking a still image. Reference numeral 103 denotes a second lens unit. The shutter with the stop 102 and the second lens unit 103 are configured so as to be integrally movable in the optical axis direction, which performs a magnification-varying operation (a zoom operation) in conjunction with the motion of the first lens unit 101.

Reference numeral 105 denotes a third lens unit, which moves in the optical axis direction to perform a focusing operation. Reference numeral 106 denotes an optical low-pass filter, which is an optical element that reduces a false color of a shot image or a moire. Reference numeral 107 denotes an image pickup element that is configured by a C-MOS sensor and its peripheral circuit. As the image pickup element 107, for example, a two-dimensional single plate color sensor that has a primary color mosaic filter of the Bayer array that is formed on a light receiving pixels of m pixels in a lateral direction and n pixels in a vertical direction in an on-chip configuration. As described below, the image pickup element 107 includes an imaging pixel and a focus detection pixel, and performs a photoelectric conversion of the object image.

Reference numeral 111 denotes a zoom actuator, which rotates a cam cylinder (not shown) to drive the first lens unit 101 to the third lens unit 103 so as to move in the optical axis direction to perform the magnification-varying operation. Reference numeral 112 denotes a stop/shutter actuator, which controls the aperture diameter of the shutter with the stop 102 to adjust a shooting light intensity and also controls an exposure time at the time of taking a still image. Reference numeral 114 denotes a focus actuator, which moves the third lens unit 105 in the optical axis direction to perform the focusing operation.

Reference numeral 115 denotes an electronic flash for illuminating the object at the time of taking the image, and a flash illumination apparatus that uses a xenon tube is suitably used as the electronic flash 115, but the present embodiment is not limited to this, and for example an illumination apparatus that includes an LED that continuously emits light may also be used. Reference numeral 116 denotes an AF assist light unit, which projects an image on a mask having a predetermined aperture pattern onto the object via a floodlight lens to improve the focus detection performance for a dark object or a low-contrast object.

Reference numeral 121 denotes a CPU (a camera controller), which is a camera CPU that governs various controls of the camera body. The CPU 121 includes a processor, a ROM, a RAM, an A/D converter, a D/A converter, a communication interface circuit, and the like, which drives various kinds of circuits of the camera 100 based on a predetermined program stored in the ROM to perform a series of operations such as AF, taking an image, image processing, or recording the image.

Reference numeral 122 denotes an electronic flash control circuit, which performs a lighting control of the electronic flash 115 in synchronization with the image pickup operation. Reference numeral 123 denotes an assist light driving circuit, which performs a lighting control of the AF assist light unit 116 in synchronization with the focus detection operation. Reference numeral 124 denotes an image pickup element driving circuit, which controls the image pickup operation of the image pickup element 107 and also performs the A/D conversion of the obtained image signal to send it to the CPU 121. Reference numeral 125 denotes an image processing circuit, which performs image processings such as a gamma conversion, a color interpolation, and a JPEG compression obtained by the image pickup element 107.

Reference numeral 126 denotes a focus driving circuit, which performs a driving control of the focus actuator 114 based on the focus detection result to move the third lens unit 105 to perform the focusing operation. Reference numeral 128 denotes a stop/shutter driving circuit, which performs a drive control of the stop/shutter actuator 112 to control the aperture of the shutter with the stop 102. Reference numeral 129 denotes a zoom driving circuit, which drives the zoom actuator 111 in accordance with a zoom operation by a user.

Reference numeral 131 denotes a display unit such as an LCD, which displays information related to an imaging mode of the camera 100, a preview image before taking an image, a confirmation image after taking the image, an in-focus state displaying image at the time of performing the focus detection, and the like. Reference numeral 132 denotes an operation switch unit, which is configured by a power switch, a release (imaging trigger) switch, a zoom operation switch, an imaging mode selecting switch, and the like. Reference numeral 133 denotes a removable flash memory, which records the taken image.

Figure 2:
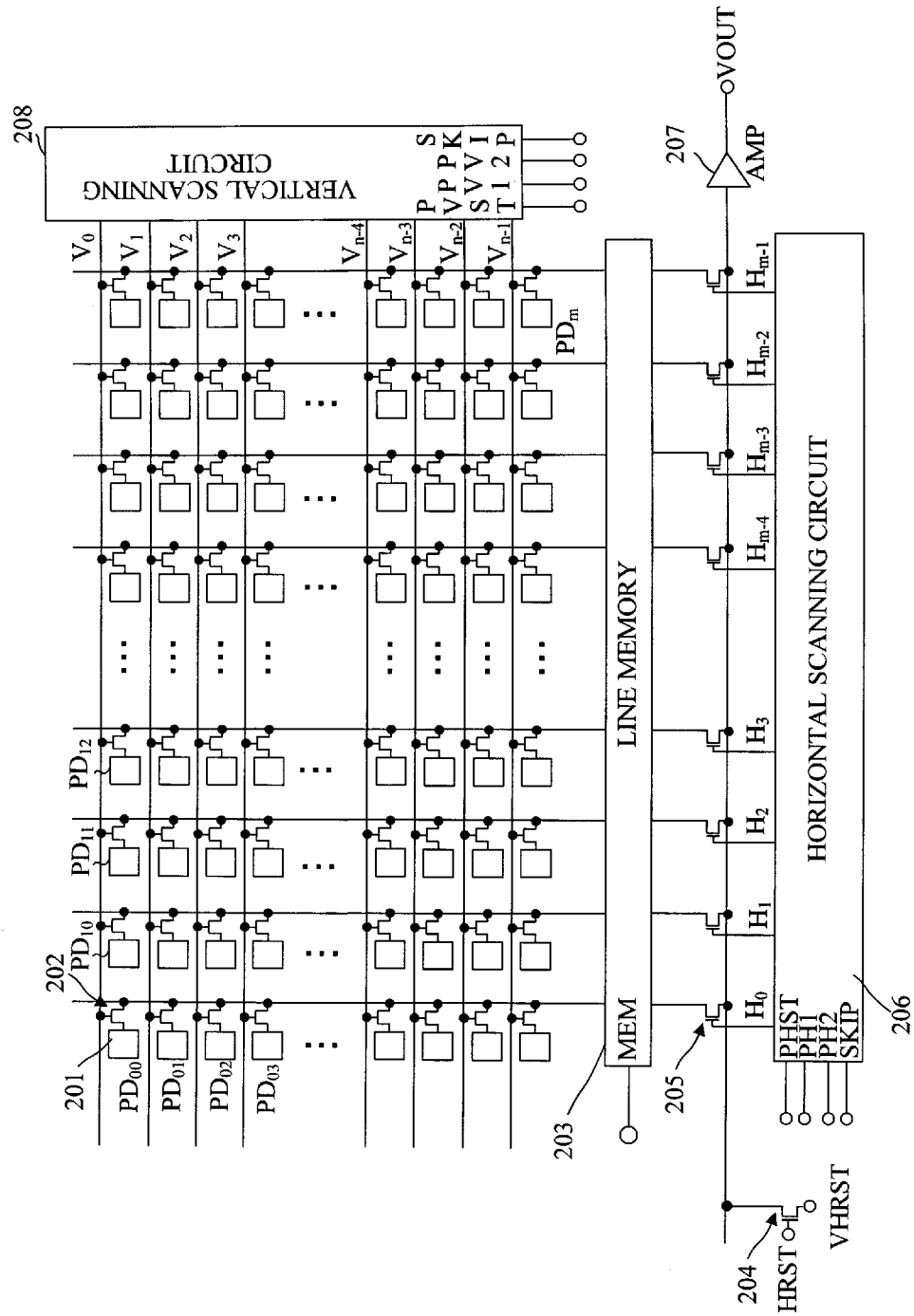
FIG. 2 is a block diagram of an image pickup element (a solid-state image pickup element) in the present embodiment.

FIG. 2 illustrates a block diagram of the image pickup element 107. The block diagram of FIG. 2 illustrates a minimum configuration necessary to describe the readout operation of the image signal, and a pixel reset signal and the like is omitted. In FIG. 2, reference numeral 201 denotes a photoelectric conversion portion (hereinafter, referred to also as a "$PD_{mn}$" where m is an address in an X direction and m=0, 1, ..., m−1, and n is an address in an Y direction and n=0, 1, ..., n−1), which is configured by a photodiode, a pixel amplifier, a switch for reset, and the like. The image pickup element 107 of the present embodiment is configured by arranging the photoelectric conversion portions of m×n on a two-dimensional plane. Reference signs are only added around the photoelectric conversion portion $PD_{00}$ at the upper left in order to avoid complexity.

Reference numeral 202 denotes a switch that selects an output of the photoelectric conversion portion 201 ($PD_{mn}$), which is selected by a vertical scanning circuit 208 for each row. Reference numeral 203 denotes a line memory (MEM) that temporarily stores the output of the photoelectric conversion portion 201 ($PD_{mn}$), which stores the outputs of the photoelectric conversion portions 201 ($PD_{mn}$) for one row that are selected by the vertical scanning circuit 208. As the line memory 203, commonly, a capacitor is used.

Reference numeral 204 denotes a switch that is connected with a horizontal output line to reset the horizontal output line to a predetermined electric potential VHRST, which is controlled by a signal HRST. Reference numeral 205 denotes switches ($H_0$ to $H_{m-1}$) that sequentially output the output signal of the photoelectric conversion portion 201 ($PD_{mn}$) stored in the line memory 203 to the horizontal output line. The switches 205 ($H_0$ to $H_{m-1}$) are sequentially scanned by a horizontal scanning circuit 206 described below to read the outputs of the photoelectric conversions for each row.

Reference numeral 206 denotes a horizontal scanning circuit, which sequentially operates the outputs of the photoelectric conversion portions 201 stored in the line memory 203 to be outputted to the horizontal output line. The signal PHST is a data input of the horizontal scanning circuit 206, reference signs PH1 and PH2 denote shift clock inputs, and the data is set on condition of PH1=H and the data is latched by the input of PH2. The signal PHST is sequentially shifted by inputting the shift clocks to the shift clock inputs PH1 and PH2, and therefore the switches 205 ($H_0$ to $H_{m-1}$) can be sequentially turned on. A signal SKIP is a control input signal that performs a setting in a decimation reading. The horizontal scanning circuit 206 can be skipped at a predetermined interval by setting the signal SKIP to the H level. Reference numeral 207 denotes an amplifier AMP that amplifies the signal of the horizontal output line to output the signal to a terminal VOUT.

Reference numeral 208 denotes a vertical scanning circuit, which can select the switch 202 of the photoelectric conversion portion 201 ($PD_{mn}$) by performing a sequential scanning to output control signals $V_0$ to $V_{n-1}$. The control signal is, similarly to the case of the horizontal scanning circuit 206, controlled by a signal PVST that is a data input, shift clocks PV1 and PV2, and a signal SKIP that sets the decimation reading. The details of the operations are similar to the horizontal scanning circuit 206, and therefore the descriptions are omitted.

FIGS. 3A, 3B, 4A, 4B, 5A, and 5B are diagrams of describing the structures of the imaging pixel and the focus detection pixel. In the present embodiment, the Bayer array in which a pixel having spectral sensitivity of G (green) is disposed on each of two diagonal pixels of the four pixels of 2×2 and pixels having spectral sensitivities of R (red) and B (blue) are disposed on other two pixels respectively is adopted. The focus detection pixels each having a structure described below are dispersed and disposed in a predetermined pattern in the Bayer array.

Figure 3A:
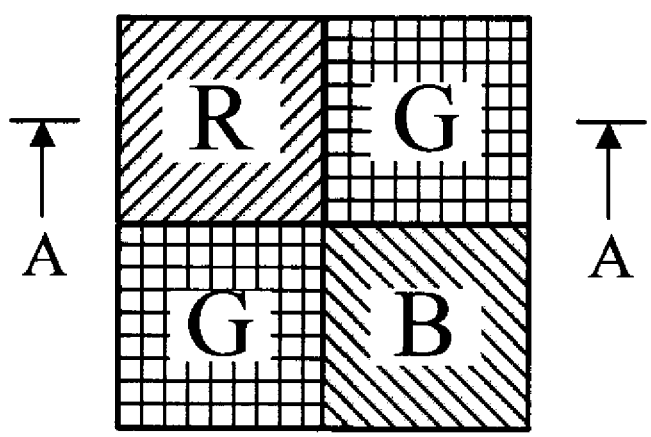
FIG. 3A is a plan view of an imaging pixel of the image pickup element in the present embodiment.
Figure 3B:
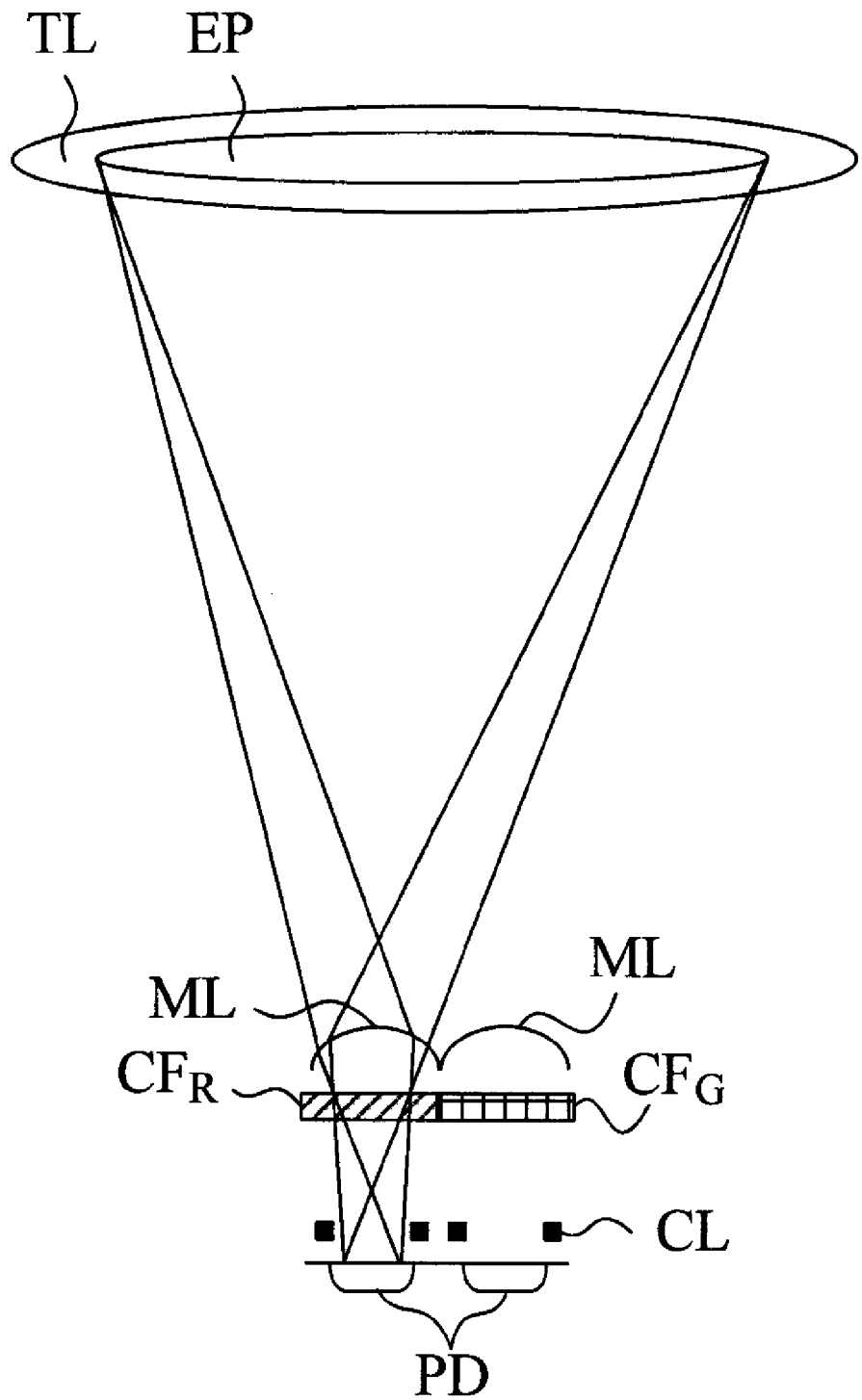
FIG. 3B is a cross-sectional view of the imaging pixel of the image pickup element in the present embodiment.

FIGS. 3A and 3B illustrate the arrangement and the structure of the imaging pixel. FIG. 3A is a plan view of the imaging pixels of two rows×two columns. As is well known, the G pixels are disposed in a diagonal direction and the R and B pixels are disposed as the other two pixels in the Bayer array. The structure of the two rows×two columns is repeatedly disposed.

FIG. 3B is a cross-sectional view illustrating a cross section A-A in FIG. 3A. Reference sign ML denotes an on-chip microlens that is disposed at the front of each pixel, reference sign $CF_R$ denotes a color filter for R (Red), and reference sign $CF_G$ denotes a color filter for G (Green). Reference sign PD schematically illustrates the photoelectric conversion portion of the C-MOS sensor, and reference sign CL denotes a wiring layer that forms a signal line transferring various kinds of signals in the C-MOS sensor. Reference sign TL schematically illustrates an image pickup optical system.

The on-chip microlens ML and the photoelectric conversion portion PD of the imaging pixel are configured so as to effectively introduce a light beam passing through the image pickup optical system TL as much as possible. In other words, en exit pupil EP of the image pickup optical system TL and the photoelectric conversion portion PD have a conjugate relation with each other by the microlens ML, and an effective area of the photoelectric conversion portion PD is designed to be a large area. FIG. 3B describes the incident light beam on the G pixel, and the R (Red) pixel and the B (Blue) pixel also have the same structure. Accordingly, the diameter of the exit pupil EP that corresponds to each of the imaging pixels of RGB is large, and the light beam from the object is efficiently introduced to improve an S/N ratio of the image signal.

Figure 4A:
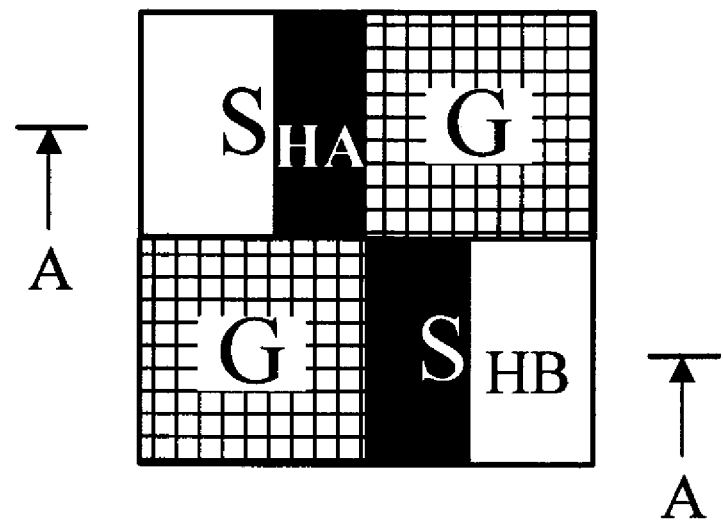
FIG. 4A is a plan view of a focus detection pixel of the image pickup element in the present embodiment.
Figure 4B:
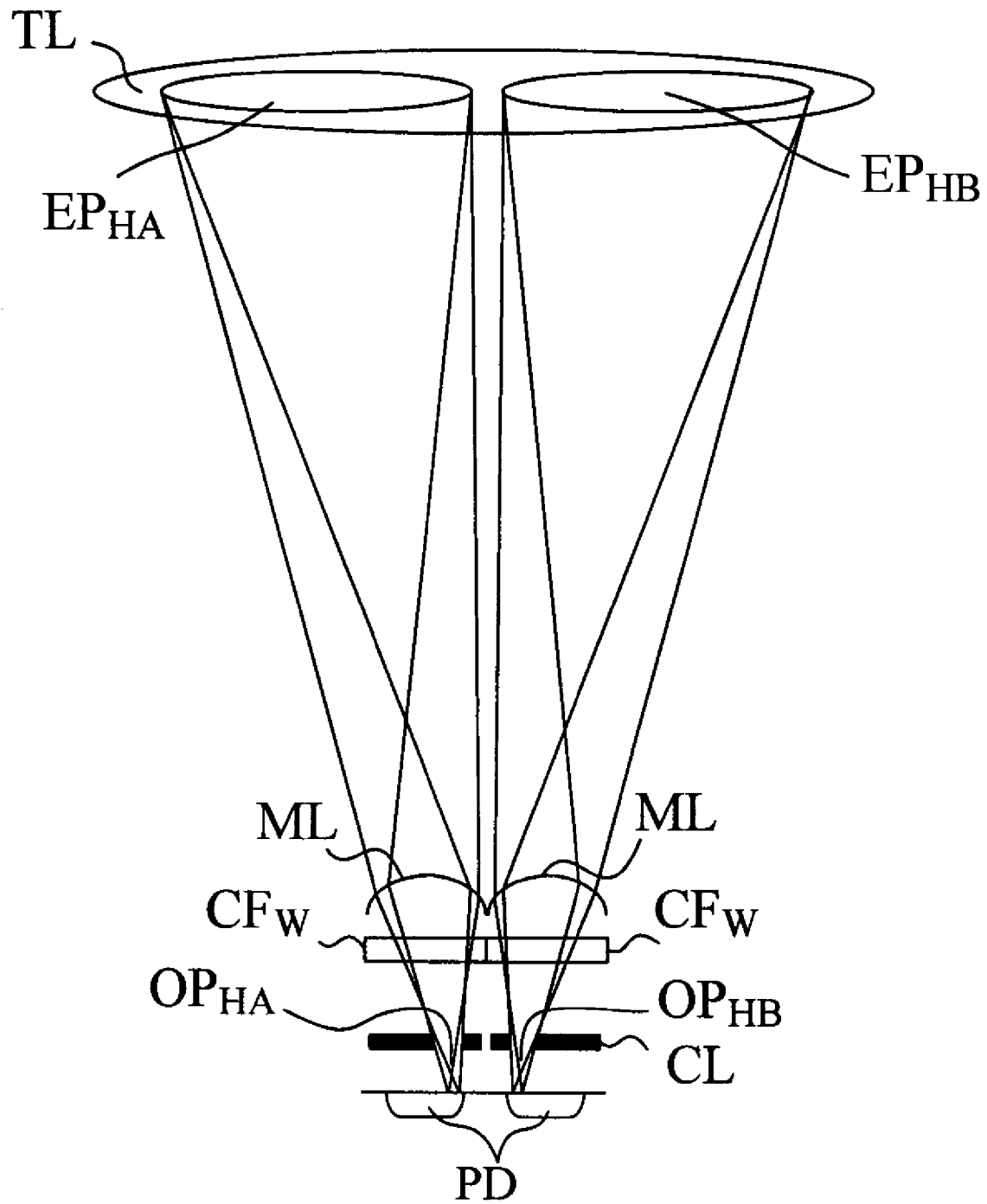
FIG. 4B is a cross-sectional view of the focus detection pixel of the image pickup element in the present embodiment.

FIGS. 4A and 4B illustrate the arrangement and the structure of the focus detection pixel that performs a pupil division in a horizontal direction (a lateral direction) of the image pickup optical system. The horizontal direction (the lateral direction) indicates a direction along a straight line that is orthogonal to the optical axis and that extends to the horizontal direction when the camera is held so that the optical axis of the image pickup optical system is horizontal. FIG. 4A is a plan view of the pixels of two rows × two columns which include the focus detection pixel. When the image signal that is to be recorded or to be watched is obtained, a principal component of luminance information is obtained by the G pixel. Since image recognition characteristics of a human are sensitive to the luminance information, the deterioration of the image quality is easily recognized if the G pixel is defective. On the other hand, the R pixel and the B pixel are pixels that obtain color information (color difference information). However, since visual characteristics of the human are insensitive to the color information, the deterioration of the image quality is not easily recognized even when the pixels obtaining the color information contain some pixels having defects. Accordingly, in the present embodiment, the G pixel of the pixels of two rows×two columns remains as the imaging pixel, and the R and B pixels are replaced with the focus detection pixels. This is denoted by reference signs $S_{HA}$ and $S_{HB}$ in FIG. 4A.

FIG. 4B is a cross-sectional view of illustrating a cross section A-A in FIG. 4A. The microlens ML and the photoelectric conversion portion PD have the same structure as those of the imaging pixel illustrated in FIG. 3B. In the present embodiment, since the signal of the focus detection pixel is not used for creating the image, a transparent film $CF_W$ (White) is disposed instead of the color separation filter. Furthermore, in order to perform the pupil division using the image pickup element, an opening portion of the wiring layer CL is displaced in one direction with respect to a center line of the microlens ML. Specifically, since an opening portion $OP_{HA}$ of the pixel $S_{HA}$ is displaced to the right side, it receives a light beam which passes through an exit pupil $EP_{HA}$ at the left side of the image pickup optical system TL. Similarly, since an opening portion $OP_{HB}$ of the pixel $S_{HB}$ is displaced to the left side, it receives a light beam which passes through an exit pupil $EP_{HB}$ at the right side of the image pickup optical system TL. The pixels $S_{HA}$ is regularly arrayed in a horizontal direction, and an object image that is obtained by these pixel groups is defined as an A image. Furthermore, the pixels $S_{HB}$ are regularly arrayed in the horizontal direction, and an object image that is obtained by these pixel groups is defined as a B image. Then, a relative position of the A image and the B image is detected and therefore a focus shift amount (a defocus amount) of the object image can be detected.

The pixels $S_{HA}$ and $S_{HB}$ can perform focus detection for an object which has a luminance distribution in a lateral direction of a shooting screen, for example a vertical line, but they cannot perform the focus detection for a lateral line that has a luminance distribution in a vertical direction. In the present embodiment, a pixel which performs the pupil division in a perpendicular direction (the vertical direction) of the image pickup optical system is also included so as to perform the focus detection in the latter case.

Figure 5A:
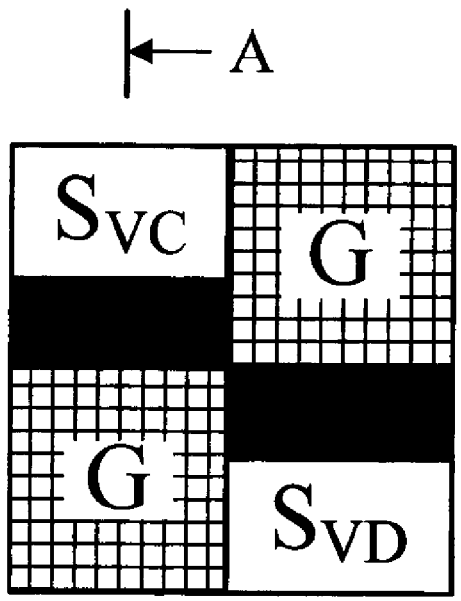
FIG. 5A is a plan view of a focus detection pixel of the image pickup element in the present embodiment.

A and 5B illustrate an arrangement and a structure of the focus detection pixel to perform the pupil division in the perpendicular direction (in other words, an upward and downward direction, or the vertical direction) of the image pickup optical system. The perpendicular direction, i.e., the upward and downward direction or the vertical and lateral direction, means a direction along a straight line that is orthogonal to the optical axis and that extends to the vertical direction when the camera is held so that the optical axis of the image pickup optical system is horizontal. FIG. 5A is a plan view of pixels of two rows×two columns that include the focus detection pixel, and similarly to FIG. 4A, a G pixel remains as the imaging pixel and an R pixel and a B pixel are used as the focus detection pixel. These pixels are illustrated as SVC and SVD in FIG. 5A.

Figure 5B:
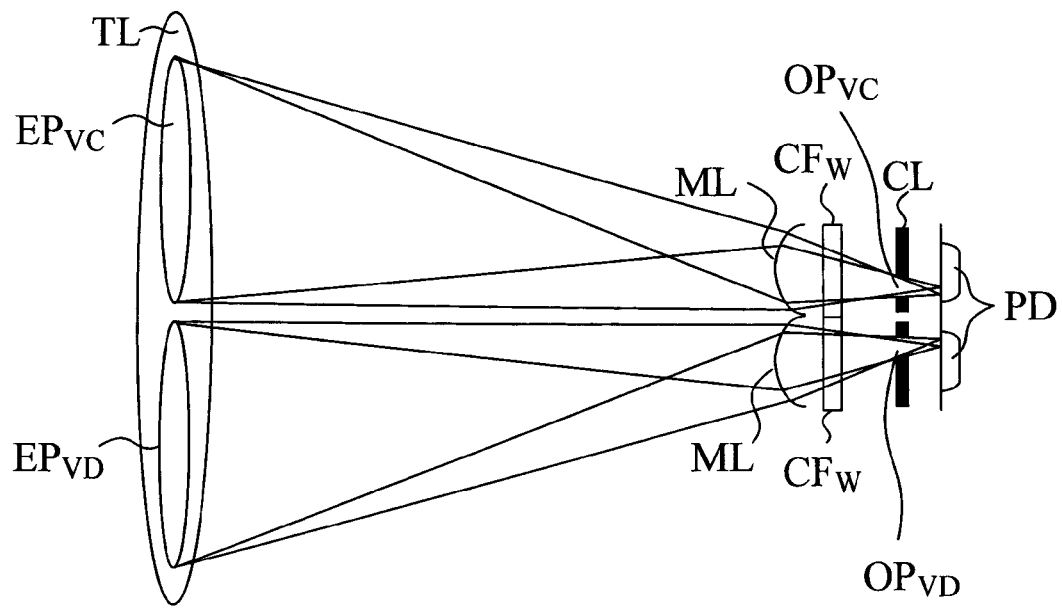
FIG. 5B is a cross-sectional view of the focus detection pixel of the image pickup element in the present embodiment.

FIG. 5B is a cross-sectional view of illustrating a cross section A-A of FIG. 5A. The pixel of FIG. 4B has the structure of performing the pupil division in the lateral direction, and on the other hand, the pupil division direction of the pixel of FIG. 5B is the vertical direction. Other pixel structures in FIG. 5B are the same as the structures in FIG. 4B. In other words, since the opening portion $OP_{VC}$ of the pixel $S_{VC}$ is displaced to the lower side, it receives a light beam which passes through an exit pupil $EP_{VC}$ at the upper side of the image pickup optical system TL. Similarly, since the opening portion $OP_{VD}$ of the pixel $S_{VD}$ is displaced to the upper side, it receives a light beam which passes through an exit pupil $EP_{VD}$ at the lower side of the image pickup optical system TL. The pixels $S_{VC}$ are regularly arrayed in the perpendicular direction, and an object image that is obtained by these pixel groups are defined as a C image. Furthermore, the pixels $S_{VD}$ are regularly arrayed in the perpendicular direction, and an object image that is obtained by these pixel groups are defined as a D image. Then, a relative position between the C image and the D image is detected, and therefore a focus shift amount (a defocus amount) of the object image that has a luminance distribution in the perpendicular direction can be detected.

Figure 6:
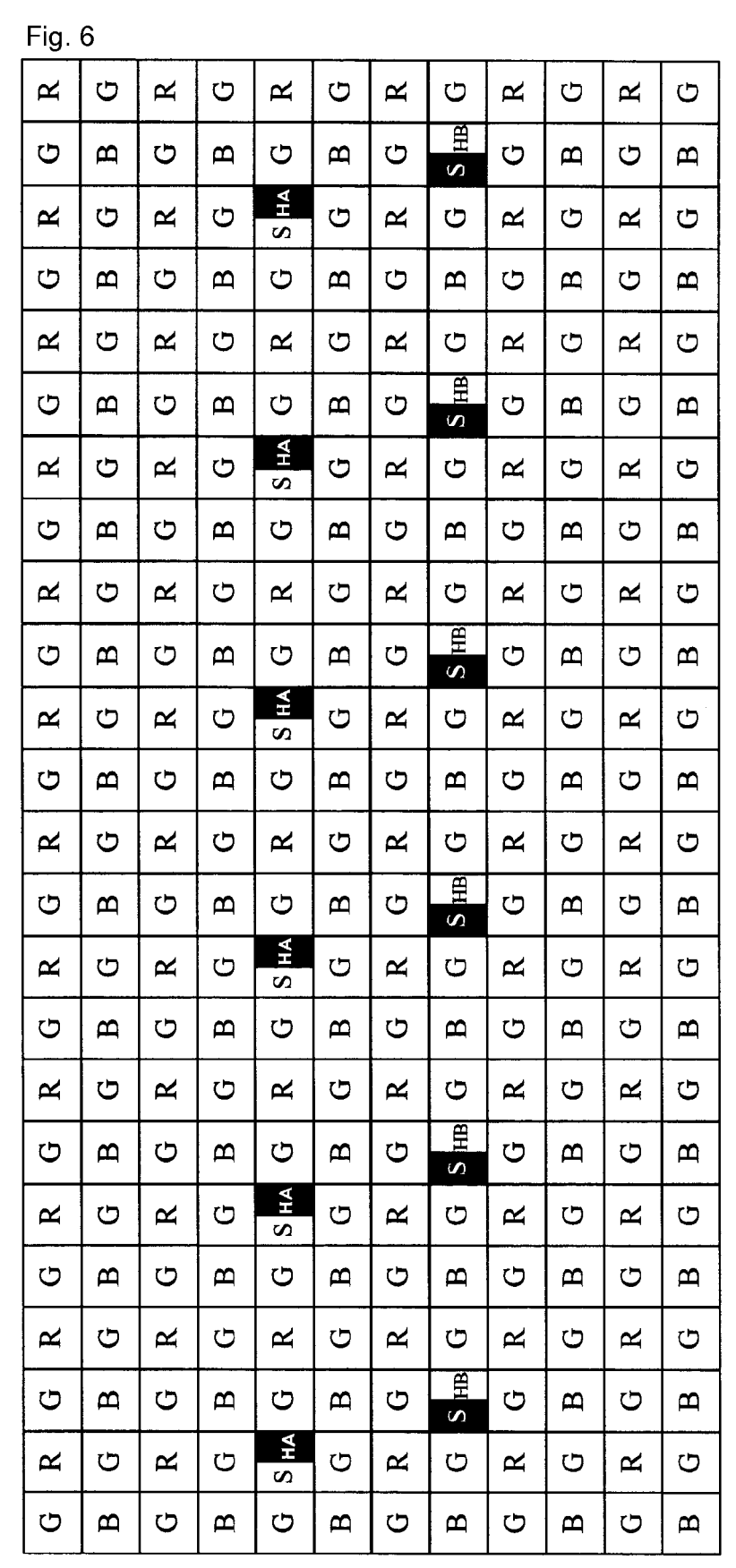

FIG. 6 is an arrangement diagram of the imaging pixels and the focus detection pixels. In FIG. 6, reference sign G denotes a pixel to which a green filter is applied, reference sign R denotes a pixel to which a red filter is applied, and reference sign B denotes a pixel to which a blue filter is applied. Reference sign $S_{HA}$ in FIG. 6 denotes a focus detection pixel that is formed by displacing the opening of the pixel portion in the horizontal direction, which constitutes a reference pixel group that is used to detect an image shift amount in the horizontal direction with reference to an $S_{HB}$ pixel group described below. Reference sign $S_{HB}$ denotes a pixel that is formed by displacing the opening portion of the pixel in an inverse direction with reference to the $S_{HA}$ pixel, which constitutes a reference pixel group that is used to detect the image shift amount in the horizontal direction with reference to the $S_{HA}$ pixel group. White portions in the $S_{HA}$ and $S_{HB}$ pixels indicate opening positions of the displaced pixels.

Figure 7:
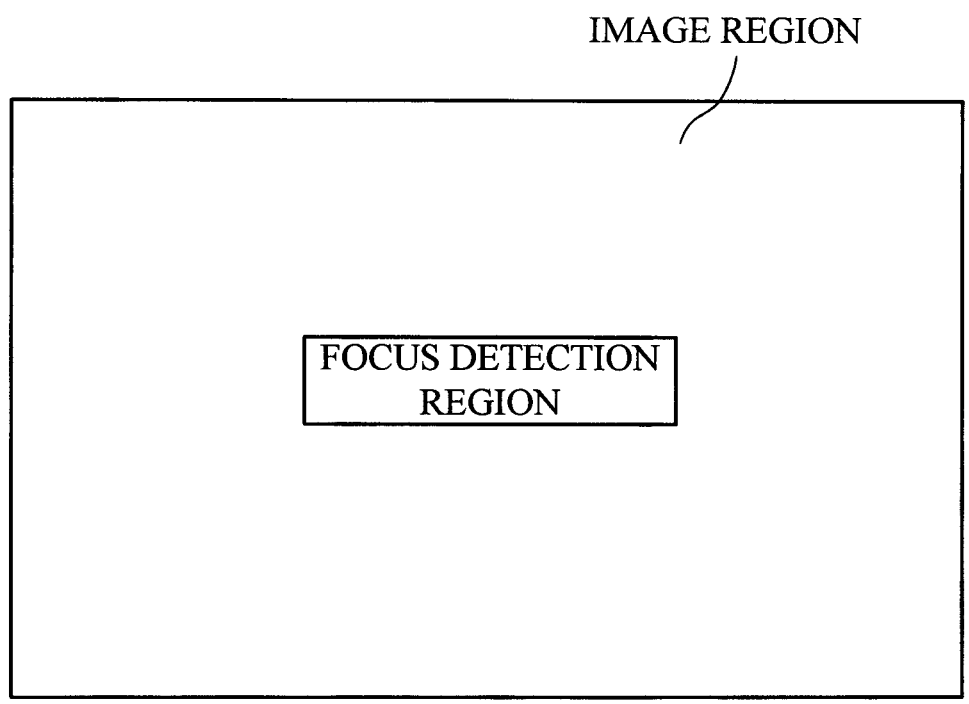
FIG. 7 is an enlarged diagram of the arrangement region of the focus detection pixel in the present embodiment.

FIG. 7 is one example of a focus detection region on the shooting screen. In FIG. 7, the focus detection region has the pixel arrangement that is illustrated in FIG. 6. In the present embodiment, the focus detection region is set so as to be at a center on the shooting screen, but a plurality of focus detection regions can also be arranged so that a sampling of an image is performed using the focus detection pixels based on the object image formed on each region.

Figure 8:
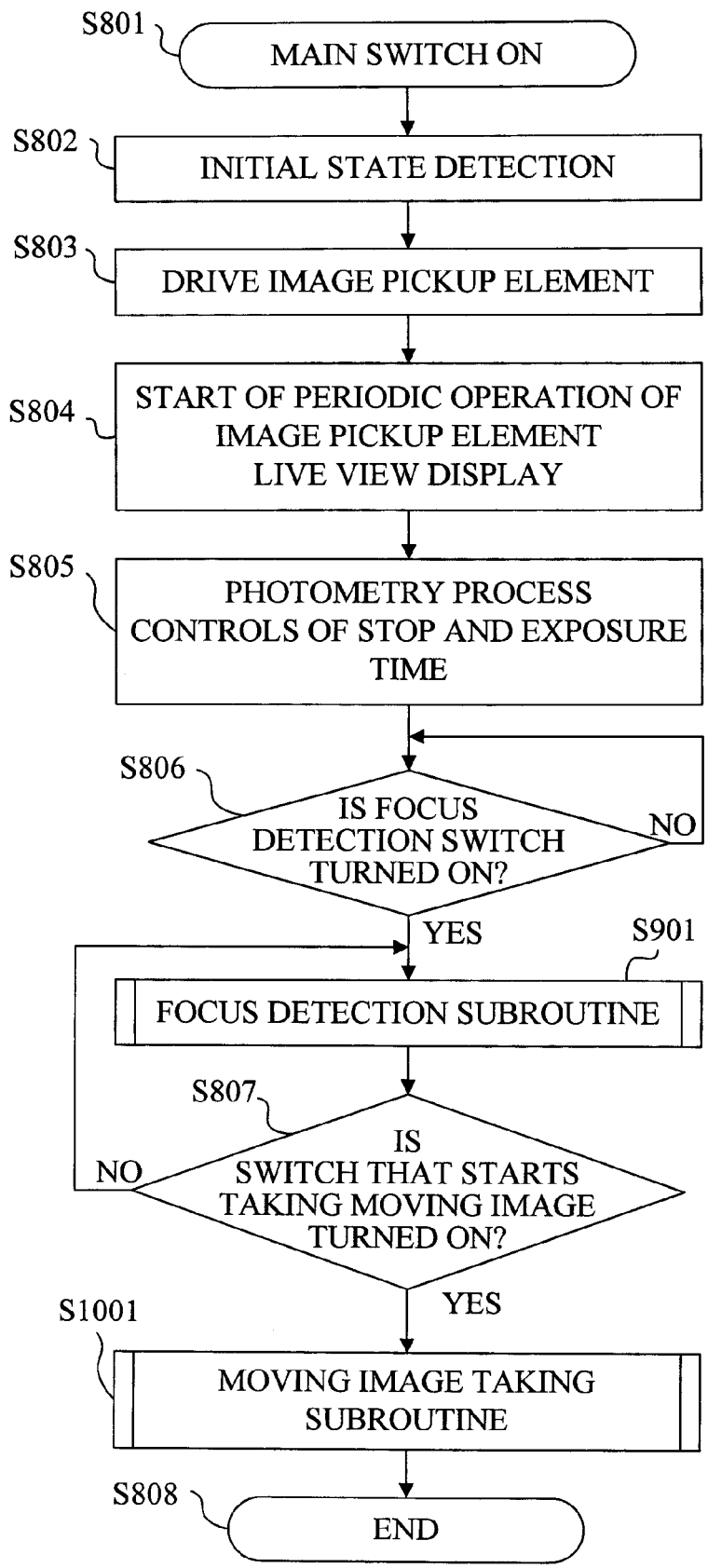
FIG. 8 is a flowchart of illustrating an operation of the camera in the present embodiment.
Figure 9:
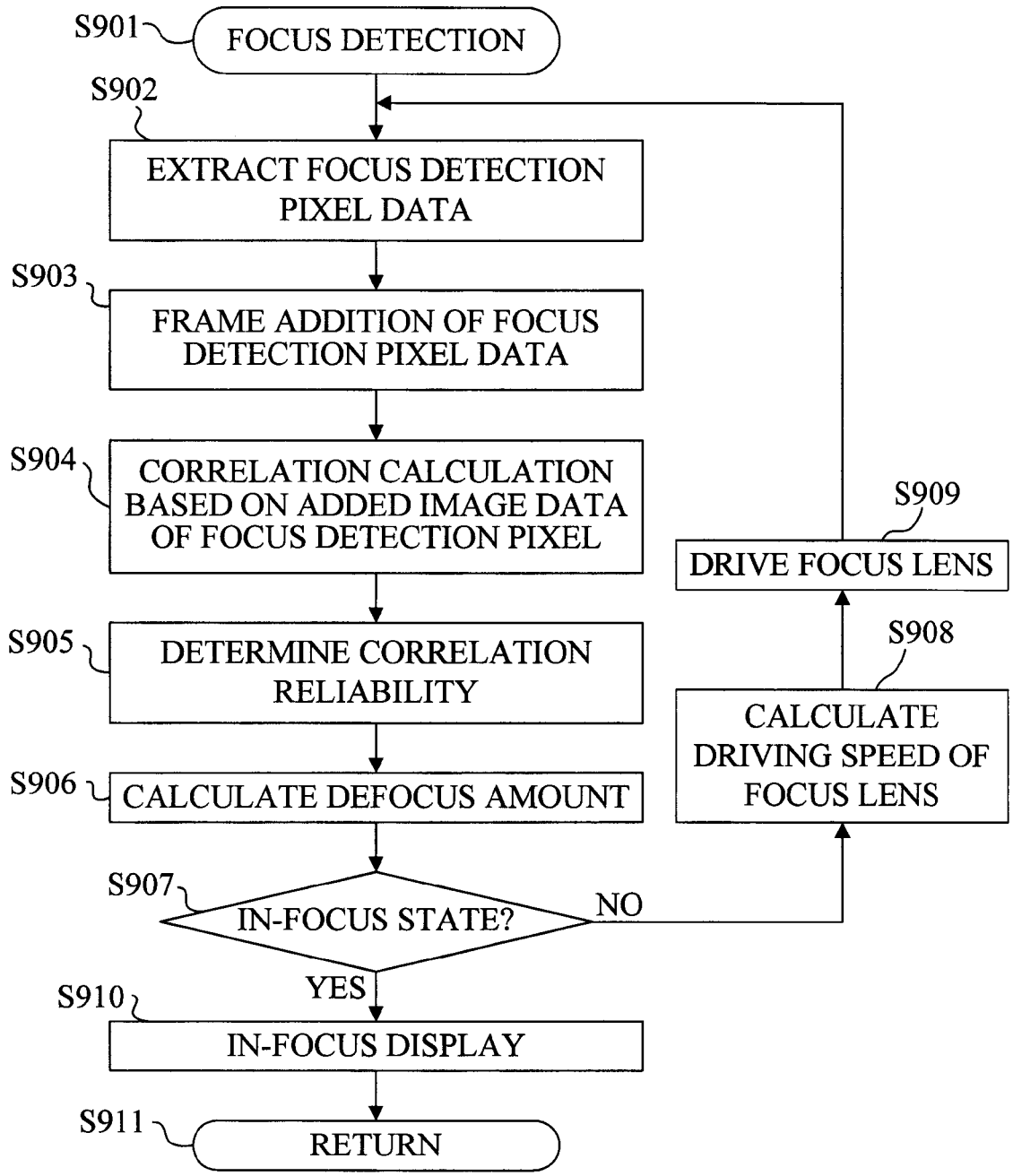
FIG. 9 is a flowchart of illustrating an operation of focus detection in the present embodiment.
Figure 10:
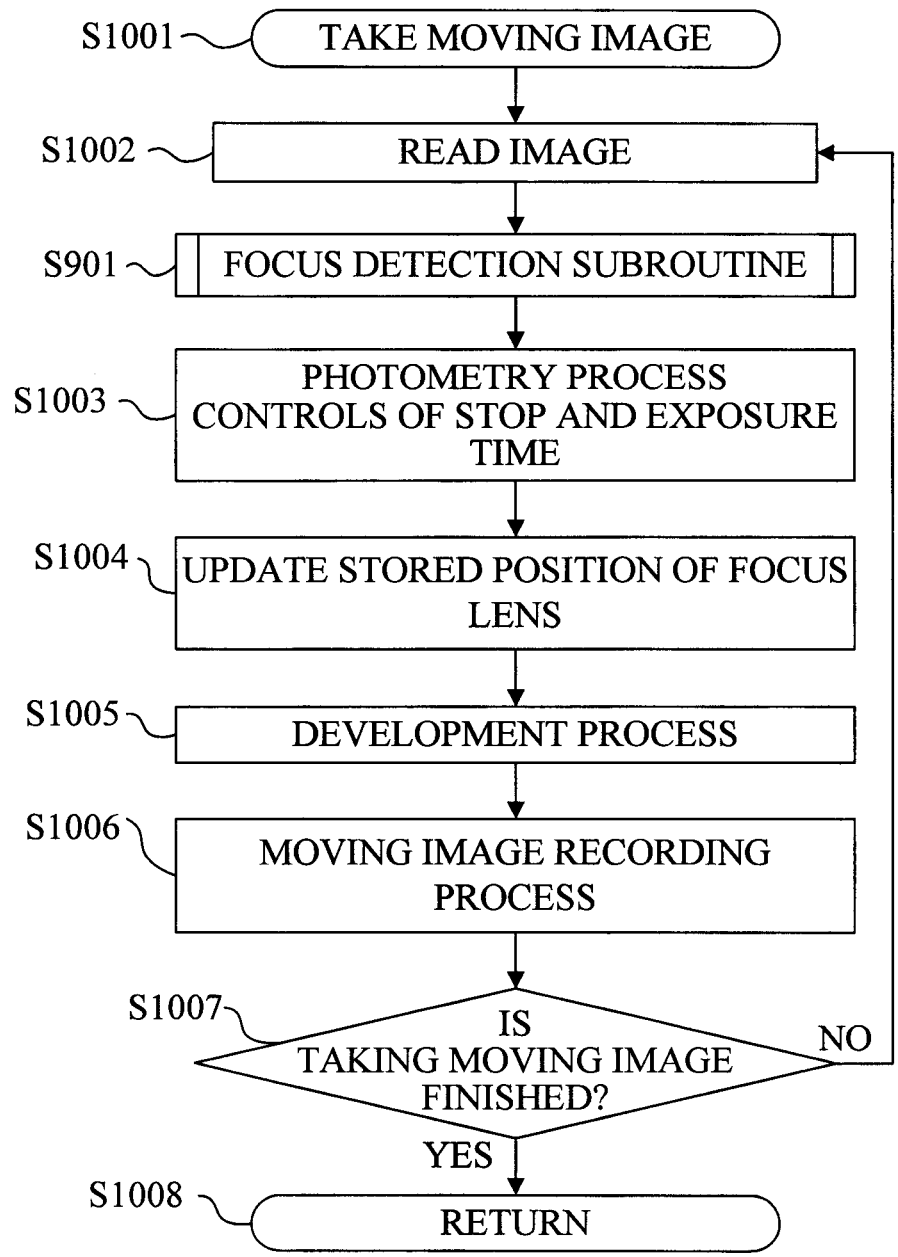
FIG. 10 is a flowchart of illustrating an operation of taking a moving image in the present embodiment.

FIGS. 8 to 10 are flowcharts of describing the focusing and the shooting processes by the camera. While referring to each drawing described above, control flows of FIGS. 8 to 10 will be described. These controls are performed based on an instruction of a CPU 121 of the camera.

FIG. 8 is a main flow of the camera when a moving image is taken from a state of a live view. First of all, in Step S801, a user operates a power switch of the camera to be turned on. In accordance with this operation, the CPU 121, in Step S802, confirms the operation of each actuator or the image pickup element in the camera, and initializes a memory and an execution program and also performs a shooting preparation operation (an initial state detection). Subsequently, in Step S803, the CPU 121 drives the image pickup element, and starts a periodic shooting operation by the image pickup element by setting a live view mode in Step S804 to display a live view image on a display unit 131. In this case, the CPU 121 (a readout unit) reads an image signal from the focus detection pixel of the image pickup element 107 with a predetermined period.

In Step S805, stop control information depending on a displaying stop value that is automatically determined in accordance with the object luminance detected by a photometric sensor (not shown), i.e. a stop value by which an image signal has a level suitable for the display when the image signal is periodically read, is sent to the CPU 121. Alternatively, the stop control information depending on an imaging stop value that is manually set by a user via an operating member (not shown) may also be sent to the CPU 121. A stop aperture diameter is set to the imaging stop value based on this control information. An exposure time is also set appropriately. Subsequently, in Step S806, whether or not a focus detection switch is turned on is determined, and the camera stands by if the focus detection switch is not turned on, and on the other hand the flow jumps to a subroutine that relates to a focus detection operation during the live view in Step S901 if the focus detection switch is turned on.

FIG. 9 illustrates a flow of the focus detection during the live view. In Step S902, the CPU 121 stores focus detection pixel data in the current frame (the image signal read by a pixel readout unit) in an internal memory (a storage unit). Subsequently, in Step S903, the CPU 121 (an addition unit) reads the image data (the image signal) of the focus detection pixel from the internal memory to perform an addition process. In other words, the CPU 121 adds a plurality of signals in time-series continuous frames of the image signals.

Figure 11:
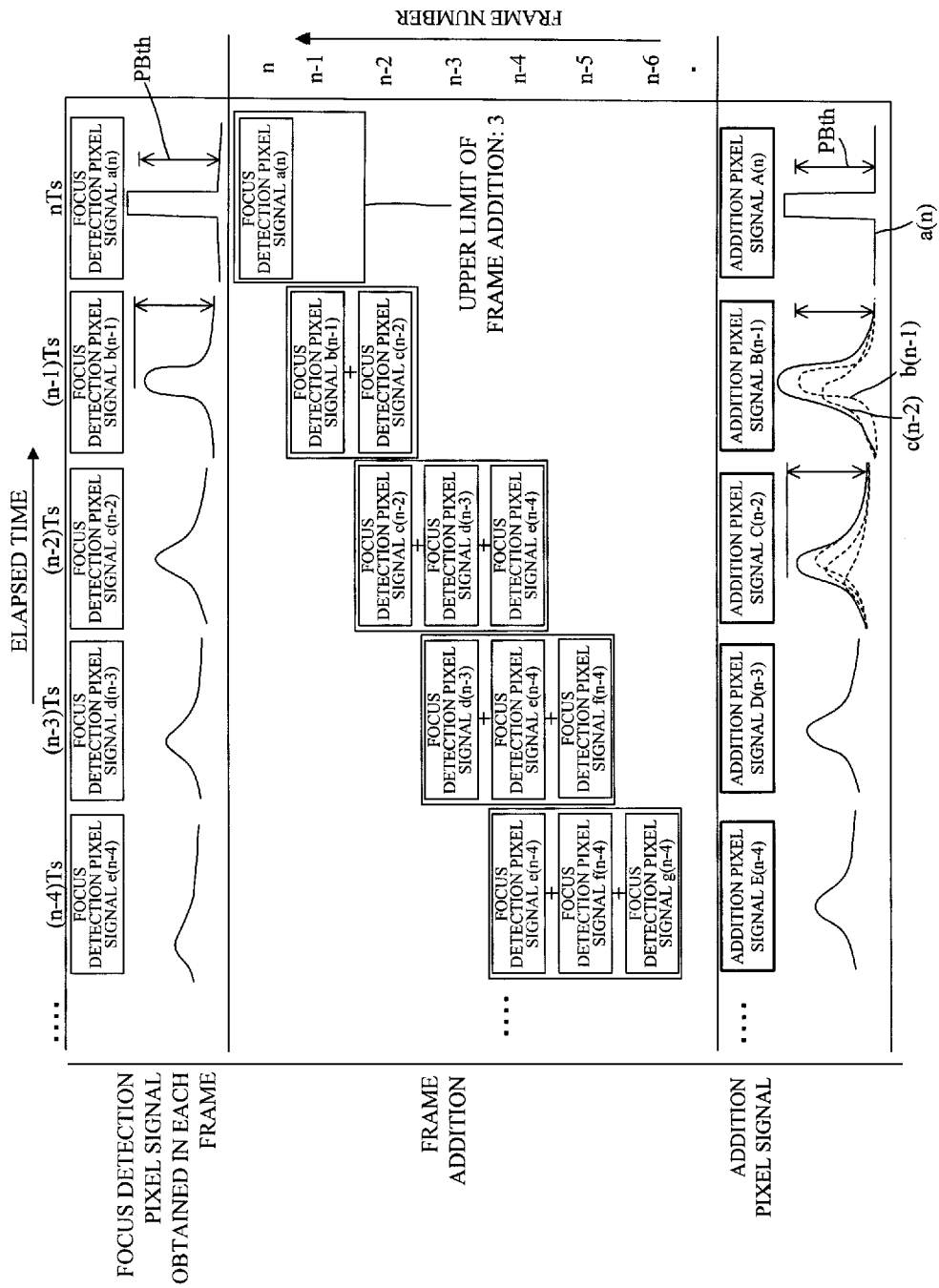
FIG. 11 is a diagram of illustrating a method of adding the focus detection pixel of the image pickup element in the present embodiment.

Referring to FIG. 11, the addition process of the image data (the image signals) of the focus detection pixel will be described. In the present embodiment, it is assumed that the focus detection operation can be performed with an overlap while the lens moves to an in-focus position, and FIG. 11 illustrates a situation where the lens comes close to the in-focus position according to the passage of time. In FIG. 11, the passage of time (the elapsed time) of reading the image signal is indicated at the top of FIG. 11. A predetermined period of reading the image signal is denoted by Ts, a reading cycle of the current frame is denoted by n, and time of the current frame is denoted by nTs. The display is refreshed by the latest image data that are read from each frame. The image data of the focus detection pixel read from each frame are stacked and stored in the internal memory. The image signal of the focus detection pixel that is read for the n-th time of the image signal is stored as a focus detection pixel signal a(n).

As a method of performing the addition process, first of all, a difference between the maximum value and the minimum value (a peak-to-bottom value: hereinafter, referred to as a PB value) of the image data of the focus detection pixels in the current frame is compared with a threshold value PBth, and the focus detection pixel signal is treated as an addition pixel signal when the PB value is beyond the threshold value PBth. In FIG. 11, it is indicated at the time nTs, and a(n) is treated as the addition pixel signal A(n) since the PB value of the focus detection pixel signal a(n) is beyond the threshold value PBth.

When the focus detection pixel signal of the latest frame is not beyond the threshold value PBth, the image data of the focus detection pixel obtained in a past frame are sequentially added and then the addition process is finished when the PB value of the addition pixel signal is beyond the threshold value PBth, and the addition result is treated as the addition pixel signal. In FIG. 11, it is indicated at the time (n-2)Ts. At the time (n-1)Ts, the PB value of the focus detection pixel signal b(n-1) is not beyond the threshold value PBth, and the PB value of the addition pixel signal is beyond the threshold value PBth when the focus detection pixel signal c(n-2) obtained in the previous frame is added to the focus detection pixel signal b(n-1). Therefore, a value of b(n-1)+c(n-2) is treated as an addition pixel signal B(n-1).

Thus, when the difference between the maximum value and the minimum value of the image signals in a predetermined frame is not beyond a predetermined threshold value, the CPU 121 (the addition unit) adds an image signal in a last frame to the image signal in the predetermined frame to calculate the addition result. On the other hand, when this difference is greater than or equal to the predetermined threshold value, the image signal in the predetermined frame is treated as the addition result.

Furthermore, the number of the image data in the past frames which are added to the image data of the current frame (hereinafter, referred to as the frame addition number) has an upper limit, and addition data up to the upper limit is treated as the addition pixel signal if the value greater than the upper limit is necessary. In FIG. 11, the upper limit of the frame addition number is set to be three, which is indicated at the time (n-2)Ts. The above description is the method of performing the addition process.

Next, in Step S904 of FIG. 9, the CPU 121 (a focus detection unit) performs a correlation processing based on the image data added in Step S903, and performs a reliability determination of the correlation in Step S905. Subsequently, the CPU 121 (the focus detection unit) calculates the defocus amount in Step S906. Thus, the CPU 121 as the focus detection unit performs the focus detection based on the addition result of the addition unit.

In Step S907, the CPU 121 determines whether the lens is near the in-focus position, i.e. whether an absolute value of the calculated defocus amount is within a predetermined value. When the CPU 121 determines that the lens is not near the in-focus position, the flow proceeds to Step S908 and the CPU 121 sends the defocus amount and the frame addition number of the focus detection pixels to the lens driving control apparatus and calculates a lens driving speed using a method described below. Subsequently, in Step S909, the CPU 121 (a lens controller) performs a lens drive. In other words, the CPU 121 as the lens controller controls the driving speed (the operations of the focus driving circuit 126 and the focus actuator 114) of the lens (the third lens unit 105) based on the addition number by the addition unit and the result of the focus detection unit. The lens controller, as described below, performs a control so that the driving speed of the lens is reduced when the addition number increases. On the other hand, when the CPU 121 determines that the lens is near the in-focus position in Step S907, the flow proceeds to Step S910 to perform an in-focus display and then the flow is returned (Step S911).

Hereinafter, a method of calculating the lens driving speed will be described. In order to drive the image pickup lens to the in-focus position smoothly and promptly, the lens driving control apparatus applies the PID control as an actuator control to calculate a driving control value of the image pickup lens and performs a position control of the image pickup lens based on the driving control value. In other words, the lens driving control apparatus includes a position table in which a position trajectory value that indicates a relation where the defocus amount is reduced as the passage of time is set, and a speed table in which a speed trajectory value that indicates a relation where the driving speed of the image pickup lens is reduced as the passage of time is set. Then, the lens driving control apparatus drives the image pickup lens to the in-focus position along the lens drive indicated by the position table.

The lens driving control apparatus suitable for the present embodiment calculates the lens driving speed based on the value of the defocus amount calculated from the image data of the focus detection pixel and the frame addition number of the addition pixel signal used in calculating the focus detection in each frame. At the time of taking a moving image, the lens (the focus lens) is also driven while the image pickup apparatus periodically performs the image pickup operation when the focus lens is not near the in-focus position. With respect to the focus detection pixel, the image data stored in the past frame that is to be added obtains object information imaged at a position different from the lens position in the current frame. Therefore, when the addition number of the image data of the focus detection pixel in the past frame increases, the S/N ratio of the addition pixel signal can be improved, but the reliability of the result of the focus detection calculation is deteriorated.

The lens driving speed (an image plane moving speed Hs) in the present embodiment is represented as the following Expression (1).

EXPRESSION 1

$$H_S = \frac{K}{N_{SF}} \cdot \frac{D_{EF}}{N_{OV} \cdot (T_{OF} + T_{CD})} \quad (1)$$

In Expression (1), reference sign K denotes a coefficient that is used to convert each element into the lens driving speed, reference sign $D_{EF}$ denotes a detected defocus amount, reference sign $T_{OF}$ denotes a time of one frame, and reference sign $N_{SF}$ denotes the frame addition number of the image data that are used to calculate the focus detection in each frame. Reference sign $T_{CD}$ denotes a communication delay time, and reference sign $N_{OV}$ denotes the number of times (the number of executions) of performing focus detection with an overlap before the focus lens reaches the in-focus position. Expression (1) represents that the lens is driven so as to be relatively fast when the detected defocus amount is large, and so as to be relatively slow when the frame addition number of the focus detection pixel is large.

The camera 100 of the present embodiment includes a determination unit (not shown) that determines the number of executions of the focus detection by the focus detection unit before the position of the lens arrives near the in-focus position, based on the result of the focus detection. The lens controller performs a control so that the driving speed of the lens is reduced when the number of executions is large (when the number is larger than a predetermined value) based on the result of the determination unit that determines the number of executions of the focus detection.

In the present embodiment, the frame addition number is used for the calculation of the lens driving speed, but the frame addition number is determined by comparing the PB value of the addition pixel signal of the focus detection pixel with the predetermined threshold value PBth as described above. The present embodiment describes the threshold value PBth that is constant, but the threshold value PBth may also be changed in real time in accordance with the object so that the lens driving speed is changed based on Expression (1).

For example, a case in which the object moves is considered. When a moving image of the moving object is taken, there are many cases in which a good appearance of the shot moving image is obtained by increasing the lens driving speed by reducing the frame addition number to place priority on the following capability for the object, rather than performing the frame addition of the focus detection pixel to improve the accuracy of one focus detection result. Furthermore, when the addition process is performed for the image data of the focus detection pixel at the time of taking an image of the moving object, an error of the focus detection result is increased due to the difference of the object positions in the current frame and the past frame. Therefore, when the object (the moving object) is detected, the threshold value PBth may be reduced and also the frame addition number may be reduced to increase the lens driving speed and to place priority on the following capability. In this case, the camera 100 includes a moving speed detection unit (not shown) that detects the moving speed of the object in the optical axis direction of the imaging optical system (the lens) based on the result of the focus detection unit and the result of the lens controller. The lens controller performs a control so as to increase the driving speed of the lens when the moving speed of the object increases based on the result of the moving speed detection unit.

As a method of improving the following capability, the threshold value PBth can also be changed in accordance with contrast information of the object. In this case, the camera 100 includes a contrast detection unit that detects the contrast of the addition result. The CPU 121 (the lens controller) performs a control so that the driving speed of the lens increases when the contrast is increased based on the result of the contrast detection unit. Compared to an object with a low contrast, an object with a high contrast can ensure the equivalent focus detection accuracy even when the frame addition number is small. In this case, the addition number of the past frames can be suppressed to the minimum to suppress the increase of the focus detection error associated with the addition process.

As described above, the present embodiment can also be applied even when the threshold value PBth is changed in real time based on the object information to adjust the frame addition number to install a control that reflects the frame addition number to the lens driving speed.

In Expression (1), the lens driving speed is set so that a plurality of focus detection operations can be performed before the focus lens reaches the in-focus position. The tables that are switched depending on the detected defocus amount are provided and the number of times $N_{OV}$ of the focus detection operations is reduced in accordance with the reduction of the defocus amount.

Next, referring to FIG. 8, the flow proceeds to Step S807 and whether a switch that starts taking the moving image is turned on is determined. When the switch is not turned on, the flow returns to Step S901 and the flow jumps to the focus detection subroutine (Step S901) again. On the other hand, when the switch is turned on, the flow proceeds to Step S1001 and jumps to a subroutine of taking a moving image.

FIG. 10 illustrates a flow of taking the moving image. When a sequence of taking the moving image starts in Step S1001, image readout from the image pickup element 107 is performed in Step S1002. Subsequently, the flow proceeds to Step S901 and the focus detection subroutine is executed. Next, in Step S1003, a photometry process and controls of the stop and exposure time are performed. After the photometry process and the like are finished, in Step S1004, the stored focus lens position is updated. Subsequently, in Step S1005, for the image read from the image pickup element 107 in Step S1002, the image data at the focus detection pixel position is interpolated using a peripheral imaging pixel and then development process is performed. Next, in Step S1006, a moving image recording process is performed.

Next, the flow proceeds to Step S1007, and whether the recording of the moving image is finished is determined. As a result, when the recording of the moving image is not finished, the flow returns to Step S1002 and the image reading is performed again. On the other hand, when the recording of the moving image is finished in Step S1007, the flow proceeds to Step S1008, and the sequence of taking the moving image is finished and the flow is returned. Then, the flow goes back to the main flow of FIG. 8, and a series of image pickup operations are finished in Step S808.

According to the above operation, in the image pickup element that includes the imaging pixels that are commonly disposed and the focus detection pixels that are discretely disposed, an appropriate lens driving control can be performed when the focus detection calculation is performed using the image data obtained by adding outputs of functional pixels in the past frame.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the camera 100 that is described in the present embodiment is configured so that the image pickup apparatus body having the image pickup element is integrated with the lens apparatus having the imaging optical system, but the embodiment is not limited to this configuration and the lens apparatus may also be configured so as to be removable from the image pickup apparatus body. In this case, the lens apparatus includes an input unit that inputs the addition number by the addition unit and the result of the focus detection unit. Furthermore, the lens apparatus includes a lens controller that controls the driving speed of the lens. This lens controller may also be configured so as to be included in the image pickup apparatus body, and in this case the lens apparatus is configured so as to input a signal from the lens controller via the input unit.

REFERENCE SIGNS LIST

100 CAMERA
105 THIRD LENS UNIT
107 IMAGE PICKUP ELEMENT
121 CPU
124 IMAGE PICKUP ELEMENT DRIVING CIRCUIT
125 IMAGE PROCESSING CIRCUIT
133 FLASH MEMORY

The invention claimed is:

1. A lens driving control apparatus comprising:
an image pickup element that includes an imaging pixel and a focus detection pixel, configured to perform a photoelectric conversion of an object image;
a readout unit configured to read image signals from the focus detection pixel with a predetermined period;
a storage unit configured to store the image signals read by the readout unit;
an addition unit configured to add a plurality of signals in time-series continuous frames of the image signals;
a focus detection unit configured to perform focus detection based on an addition result by the addition unit; and
a lens controller configured to set a driving speed of a lens based on the addition number of times by the addition unit and a result of the focus detection unit every time the image signals are read, and to control the driving speed of the lens,
wherein the lens controller performs a control so that the driving speed of the lens is reduced when the addition number of times increases.

2. The lens driving control apparatus according to claim 1, wherein the addition unit calculates the addition result by adding an image signal in a last frame to an image signal in a predetermined frame when a difference between the maximum value and the minimum value of the image signal in the predetermined frame is beyond a predetermined threshold value, and
wherein the addition unit treats the image signal in the predetermined frame as the addition result when the difference is at least the predetermined threshold value.

3. The lens driving control apparatus according to claim 1, further comprising a determination unit configured to determine the number of executions of the focus detection by the focus detection unit before a position of the lens arrives near in-focus position based on a result of the focus detection,
wherein the lens controller performs a control so that the driving speed of the lens is reduced when the number of executions is larger than a predetermined value based on a result of the determination unit.

4. The lens driving control apparatus according to claim 1, further comprising a moving speed detection unit configured to detect a moving speed of an object in an optical axis direction of the lens based on the result of the focus detection unit and a result of the lens controller,
wherein the lens controller performs a control so that the driving speed of the lens increases when the moving speed is increased based on a result of the moving speed detection unit.

5. The lens driving control apparatus according to claim 1, further comprising a contrast detection unit configured to detect a contrast of the addition result,
wherein the lens controller performs a control so that the driving speed of the lens increases when the contrast is increased based on a result of the contrast detection unit.

6. A lens apparatus comprising:
an imaging optical system including a lens, configured to form an object image;
an input unit configured to input the addition number of times by an addition unit and a result of a focus detection unit from an image pickup apparatus body comprising:
an image pickup element that includes an imaging pixel and a focus detection pixel, configured to perform a photoelectric conversion of an object image,
a readout unit configured to read image signals from the focus detection pixel with a predetermined period,
a storage unit configured to store the image signals read by the readout unit,
the addition unit configured to add a plurality of signals in time-series continuous frames of the image signals, and
the focus detection unit configured to perform focus detection based on an addition result by the addition unit; and
a lens controller configured to set a driving speed of the lens based on the addition number of times by the addition unit and a result of the focus detection unit every time the image signals are read, and to control the driving speed of the lens,
wherein the lens controller performs a control so that the driving speed of the lens is reduced when the addition number of times increases.

* * * * *